US009002857B2

(12) United States Patent
Robinson et al.

(10) Patent No.: US 9,002,857 B2
(45) Date of Patent: Apr. 7, 2015

(54) METHODS FOR SEARCHING WITH SEMANTIC SIMILARITY SCORES IN ONE OR MORE ONTOLOGIES

(75) Inventors: Peter N. Robinson, Berlin (DE); Marcel H. Schulz, Berlin (DE); Sebastian Bauer, Berlin (DE); Sebastian Köhler, Berlin (DE)

(73) Assignees: Charite-Universitatsmedizin Berlin, Berlin (DE); Max-Planck-Gesellschaft zur Forderung der Wissenschaften E.V., Munich (DE)

( * ) Notice: Subject to any disclaimer, the term of this patent is extended or adjusted under 35 U.S.C. 154(b) by 905 days.

(21) Appl. No.: 12/461,517

(22) Filed: Aug. 13, 2009

(65) Prior Publication Data

US 2011/0040766 A1 Feb. 17, 2011

(51) Int. Cl.
*G06F 17/30* (2006.01)

(52) U.S. Cl.
CPC ...... *G06F 17/3053* (2013.01); *G06F 17/30722* (2013.01)

(58) Field of Classification Search
CPC .. G06Q 30/02; G06Q 10/10; G06F 17/30864; G06F 17/30038; G06F 17/30265
USPC ........................................................ 707/749
See application file for complete search history.

(56) References Cited

U.S. PATENT DOCUMENTS

| | | | |
|---|---|---|---|
| 6,233,575 B1 * | 5/2001 | Agrawal et al. .................. | 1/1 |
| 6,285,999 B1 | 9/2001 | Page | |
| 7,162,465 B2 * | 1/2007 | Jenssen et al. .................. | 1/1 |
| 7,373,355 B2 * | 5/2008 | Hite et al. ....................... | 1/1 |
| 7,472,137 B2 * | 12/2008 | Edelstein et al. ................ | 1/1 |
| 7,685,118 B2 * | 3/2010 | Zhang ......................... | 706/55 |
| 7,836,077 B2 * | 11/2010 | Azvine et al. ................ | 707/771 |
| 7,904,401 B2 * | 3/2011 | Dolby et al. ................... | 706/45 |
| 7,933,915 B2 * | 4/2011 | Singh et al. .................. | 707/760 |
| 7,934,224 B2 * | 4/2011 | Pomeroy et al. .............. | 719/328 |
| 7,962,503 B2 * | 6/2011 | Edelstein et al. ............. | 707/761 |
| 8,391,618 B1 * | 3/2013 | Chuang et al. ................ | 382/224 |

(Continued)

FOREIGN PATENT DOCUMENTS

EP 1 691 311 A1 8/2006

OTHER PUBLICATIONS

Manikandan, et al. "Functionally important segments in proteins dissected using Gene Ontology and geometric clustering of peptide fragments" Genome Biology, 2008, vol. 9, Issue 3, Article R52-R52. 18.

(Continued)

*Primary Examiner* — Sheree Brown
(74) *Attorney, Agent, or Firm* — Foley & Lardner LLP

(57) ABSTRACT

A method assigns importance ranks to documents within repositories or databases, such as any database of documents such as books or other printed material, electronic documentation, and pages within the world-wide web. The method uses a corpus of indexed documents that has been annotated to the terms of one or more ontologies in order to assign a semantic similarity score to queries based on terms taken from the ontologies. A statistical model is used to test the significance of matches between query terms and documents or categories. The method results in an acceleration of over 10,000-fold for realistic queries and ontologies, and makes it practicable to calculate P-values dynamically or to keep database annotations and the related P-value distributions up to date by frequent recalculation.

21 Claims, 8 Drawing Sheets

(56) References Cited

U.S. PATENT DOCUMENTS

| | | | |
|---|---|---|---|
| 2005/0216459 A1* | 9/2005 | Vailaya et al. | 707/5 |
| 2008/0040308 A1* | 2/2008 | Ranganathan et al. | 707/1 |
| 2008/0147382 A1 | 6/2008 | Mishra et al. | |
| 2009/0012842 A1* | 1/2009 | Srinivasan et al. | 705/10 |
| 2009/0024615 A1* | 1/2009 | Pedro et al. | 707/5 |
| 2009/0049019 A1* | 2/2009 | Su et al. | 707/3 |
| 2009/0083203 A1* | 3/2009 | Cho et al. | 706/21 |
| 2010/0131516 A1* | 5/2010 | Jean-Mary | 707/749 |

OTHER PUBLICATIONS

Tsoi, et al. "Evaluation of genome-wide association study results through development of ontology fingerprints", Bioinformatics, 2009, vol. 25, No. 10, pp. 1314-1320.

Xu, et al. "A Method for Measuring Semantic Similarity of Concepts" International Multi-Symposiums on Computer and Computational Sciences, 2008, pp. 207-213 (XP-002610891).

Resnik, Philip, "Using Information Content to Evaluate Semantic Similarity in a Taxonomy", Proceedings of the 14$^{th}$ International Joint Conference on Artificial Intelligence (IJCAI), 1995, pp. 448-453.

Lin, Dekang, "An Information-Theoretic Definition of Similarity", Proceedings of the 15$^{th}$ International Conference on Machine Learning, pp. 296-304.

Jiang, J et al., "Semantic Similarity Based on Corpus Statistics and Lexical Taxonomy", Proceedings of the 10$^{th}$ International Conference on Research on Computational Linguistics, 1997, pp. 1-15.

Robinson, Peter N., "The Human Phenotype Ontology: A Tool for Annotating and Analyzing Human Hereditary Disease", The American Journal of Human Genetics, vol. 83, Nov. 2008, pp. 610-615.

Lord, P.W. et al, "Investigating Semantic Similarity Measures Across the Gene Ontology: The Relationship Between Sequence and Annotation", Bioinformatics, vol. 19, No. 10, 2003, pp. 1275-1283.

Blizard, Wayne D., "Multiset Theory", Notre Dame Journal of Formal Logic, vol. 30, No. 1, pp. 36-66.

Köhler, Sebastian et al., "Clinical Diagnostics with Semantic Similarity Searches in Ontologies", May 20, 2009, pp. 1-9.

Schulz, Marcel H. et al., "Exact Score Distribution Computation for Similarity Searches in Ontologies", 13 pgs.

* cited by examiner

Algorithm 3.1: Compute *Children* attribute 1    for $n_i \in V$ in topological order do
2      for $j$ in $e_{i,j} \in E$ do    /* set weights of outgoing edges */
3        if $n_i \in annot_{\mathcal{T}}s$ then
4          $w_{i,j} \leftarrow IC(n_i)$
5        else
6          $w_{i,j} \leftarrow \max\{w_{h,i} | e_{h,i} \in E\}$ 7    convert directed edges in $E$ in undirected edges
8    $MST$ = maximum spanning tree of $D$
9    for edge $e_{i,j} \in MST$ do                                          /* compute $MST'$ */
10      if $n_i, n_j \in annot_{\mathcal{T}}s$ then
11        remove $e_{i,j}$ from $MST$ 12    for $n_i \in annot_{\mathcal{T}}s$ do
13      $Children(n_i) \leftarrow$ size of connected component in $MST'$ containing $n_i$
14    return

Fig. 7

Algorithm 3.2: Faster score distribution computation for $sim^{avg}$

Input: $V, q, \mathcal{TS}$
Output: The score distribution, i.e., $\mathcal{SD} = \{(s_1, f_1), \ldots, (s_k, f_k)\}$ 1   $\mathcal{SD} = \emptyset$
2   foreach *distinct multiset* $M = \{(u_1, M_1), \ldots, (u_d, M_d)\}$,
    $|M| = q, U \subseteq annot_{\mathcal{TS}}$ do
3      $s_{new} \leftarrow sim^{avg}(M, \mathcal{TS})$
4      $(s, f) \leftarrow getScorePair(\mathcal{SD}, s_{new})$
5      if $(s, f) \neq nil$ then
6         $putScorePair(\mathcal{SD}, (s_{new}, f + freq(M)))$
7      else
8         $putScorePair(\mathcal{SD}, (s_{new}, freq(M)))$
9   return $\mathcal{D}$

Fig. 8

METHODS FOR SEARCHING WITH SEMANTIC SIMILARITY SCORES IN ONE OR MORE ONTOLOGIES

BACKGROUND

The invention provides techniques for indexing and searching in databases using ontologies. Categories or individual documents within the database that are annotated to the terms of the ontology can be searched and prioritized using statistical models to test for significance of the similarity scores of queries against the database. The database can be any repository of documents such as books, articles, internal company documentation, or web pages. One or more domain-specific ontologies can be used to annotate the categories or a subset of the documents in the repository. A method is presented to calculate the score distribution that is required for this search in a streamlined manner that results in a great savings in computational time and effort. The disclosed method can be used for assigning ranks for documents such as books in a repository, items in online auction websites, documents within a repository of a company, or web pages.

The amount of documents available for searches has grown enormously over the last decades, so that methods for performing intelligent searches among such documents have become very important. A very well-known method for searching in hyperlinked documents is the PageRank algorithm as implemented by Google (U.S. Pat. No. 6,285,999). In essence, the PageRank algorithm has been so successful because it capitalizes on the structure of the web of hyperlinks to better identify relevant, high-quality web pages based on features such as the number of other web pages that link to a given page. However, the amount of other types of documents such as books or other forms of document that are not linked to one another (e.g., by hyperlinks as in the WWW) is steadily increasing. The PageRank algorithm per se cannot be used to search such documents. The disclosed methods can search both in web pages and in documents that do not have hyperlinks.

In order to explain the invention, some concepts concerning ontologies, distributions, and statistics that are needed to understand it are first reviewed.

In Philosophy, ontology is the discipline which aims to understand how things in the world are divided into categories and how these categories are related to one another. In Computer Science, the word ontology is used with a related meaning to describe a structured, automated representation of the knowledge within a certain domain in fields such as science, government, industry, and healthcare. An ontology provides a classification of the entities within a domain. Each entity is said to make up a term of the ontology. Furthermore, an ontology must specify the semantic relationships between the entities. Thus, an ontology can be used to define a standard, controlled vocabulary for any field of knowledge. Ontologies are commonly represented in the form of directed acyclic graphs (DAGs). A graph is a set of nodes (also called vertices) and edges (also called links) between the nodes. In directed graphs, the edges are one-way and go from one node to another. A cycle in a directed graph is a path along a series of two or more edges that leads back to the initial node in the path. Therefore, a DAG is a directed graph that has no cycles. The nodes of the DAG, which correspond to the terms of the ontology, are assigned to entities in the domain and the edges between the nodes represent semantic relationships. Ontologies are designed such that terms closer to the root are more general than their descendant terms. For many ontologies, the true-path rule applies, that is, entities are annotated to the most specific term possible but are assumed to be implicitly annotated to all ancestors of that term (This is one reason why cycles are not permitted in graphs used to represent ontologies). FIG. 1 shows an excerpt of an ontology displayed in the form of a DAG.

Ontologies are used in artificial intelligence, the Semantic Web, biomedical research, and many other areas as a form of knowledge representation about the world or some part of it. One of the advantages of ontologies is that they allow searches to include semantically related descendent terms, which can increase the number of documents found as compared to methods that merely take the search term as a text string.

As mentioned above, ontologies consist of well-defined concepts that are connected to one another by semantic relationships. This has inspired a number of algorithms that exploit these relationships in order to define similarity measures for terms or groups of terms in ontologies. All of the algorithms require, in addition to the ontology, an annotated corpus of information. The information content of a term is commonly defined as the negative logarithm of its probability (this is related to the use of $-\log_2(p)$ in the definition of uncertainty or "surprisal" used in information theory). According to this definition, ontology terms that are used to annotate many items have a low information content. For instance, assuming that all items are annotated to the root (the most general term) of the ontology, the information content of the root is $-\log_2(1)=0$. Intuitively, this means that if an item is chosen at random and discovers that it is annotated to the root term, this is not at all surprising because all items are annotated to the root. On the other hand, assuming there are 256 annotated items in a corpus of information, the information content of a term used to annotate only one item is $-\log_2(1/256)=8$ (recall that $2^8=256$), the information content of a term used to annotate two items is $-\log_2(2/256)=7$, and so on. Intuitively, if an item is chosen at random and find it is annotated to a term with a high information content, we are in some sense "surprised". FIG. 2 illustrates the relationship between information content and annotation frequency of ontology terms. Other definitions of information content, for instance with logarithms to other bases, or the frequency, or the number of children terms a term has, can also be used.

This definition can be used in order to calculate the semantic similarity between two terms of an ontology. A simple and effective measure is the one originally proposed by Resnik (Resnik, P. Using information content to evaluate semantic similarity in a taxonomy. In Proceedings of the 14th International Joint Conference on Artificial Intelligence, 1995, pp. 448-453), whereby the similarity between two nodes is defined as the maximum information content among all common ancestors. Denoting the set of all common ancestor terms of terms $t_1$ and $t_2$ as $A(t_1,t_2)$, the similarity between two terms $t_1$ and $t_2$ can be calculated as $$sim(t_1, t_2) = \max_{a \in A(t_1,t_2)} -\log p\ (a) \qquad (1)$$

An example of this is shown in FIG. 3. Several variations on the original semantic similarity measure described above have been presented, all of which are applicable to the invention presented below. Prominent examples of other information-theory based similarity metrics are (Lin D, An Information-Theoretic Definition of Similarity. In: Proc. of the 15th International Conference on Machine Learning. San Francisco, Calif.: Morgan Kaufmann, pp. 296-304) and (Jiang J and Conrath D, Semantic similarity based on corpus statistics and lexical taxonomy. In: Proc. of the 10th International Conference on Research on Computational Linguistics, Taiwan), and these and other similar metrics can be used as components of the disclosed methods.

In (Robinson et al., The Human Phenotype Ontology: a tool for annotating and analyzing human hereditary disease. Am J Hum Genet, 2008, 83:610-5), this measure was extended to investigate the semantic similarity between a set of query terms and an object that is annotated with the terms of an ontology. For instance, a query Q might consist of the terms $t_1$, $t_2$, and $t_3$, whereas an object in a database D might be annotated by terms $t_2$ and $t_4$. In order to calculate a similarity between query and object, a method is needed for combining pairwise term similarities. A number of ways of doing this for comparing pairs of objects in databases have been proposed (e.g. Lord et al., Investigating semantic similarity measures across the Gene Ontology: the relationship between sequence and annotation. Bioinformatics, 2003, 19:1275-1283). This was extended in (Robinson et al., 2008) to use terms of an attribute ontology to search for the items in a database that best match the query term. There are several ways of doing this, but perhaps the simplest is to take for each query term the best matching term used to annotate the object and to average the corresponding pairwise similarity scores. To do this, each ontology term from the query Q is matched with the most similar term from the database object item D and the average is taken over all such pairs:

$$sim(Q \to D) = avg\left[\sum_{s \in Q} \max_{t \in D} sim(s, t)\right] \quad (2)$$

In (Robinson et al., 2008), this was used to search for differential diagnoses in a medical setting. This scheme can also be used together with the more recent developments (see below) to define the semantic similarity of each item in a database or other collection of items to the terms of the query, and to rank these items according to the similarity score.

In statistics, the P-value is defined as the probability, under the assumption of no effect or no difference (the null hypothesis), of obtaining a result equal to or more extreme than what was actually observed. The P-value is often used in science and medicine as an informal index as a measure of discrepancy between the data and the null hypothesis (although this is not entirely accurate from a statistical point of view). One way of assigning a P-value to a score from a discrete distribution is to calculate the distribution of all possible scores. Assuming that higher scores are better, the P-value of any given score is simply the proportion of scores that are equal to or higher than this score. Such a distribution can be calculated for similarity searches in ontologies by exhaustively calculating the score for all possible combinations of terms in the ontology. Since this approach requires a lot of computational effort, permutation approaches can also be used, whereby a large number (e.g., 100,000) of combinations of terms are chosen at random. The resulting distribution of scores is an approximation to the true score distribution if enough permutations are performed. The permutation approach is computationally costly.

Ontologies can be used to classify and describe the items (entities) of a domain. For instance, an ontology can be used to classify European wines (FIG. 4).

Domain ontologies represent the kind of ontology that have been in wide use up to the present. One can use domain ontologies to improve searches by linking the ontology terms that are semantically linked. For instance, if a user is searching an online wine catalog for "white wine", the wine ontology can be used to return not only catalog items listed as "white wine" but also items listed as "Riesling", "Sauvignon Blanc", or "Grauer Burgunder".

A second kind of ontology can be used to describe the attributes (or characteristics) of the items in a domain. Staying with the wine example, an ontology can be imagined that describes the attributes of wine including its color, smell, taste, acidity, and so on (FIG. 5).

This kind of ontology can be used to annotate various kinds of wine in a catalog. For instance, a Riesling might be annotated with the terms white, dry, and lemon, and a Rioja might be annotated with the terms red, dry, and almond scent. Now, users of the online wine catalog can enter the characteristics they prefer in wine, say red, nutty, and medium dry. The semantic similarity algorithms presented in this invention can be used to identify the catalog items (wines) that best match the user's query. Similar to this, clinical features can be regarded as attributes of diseases. Physicians can enter the clinical features they have observed in their patients and use the semantic similarity algorithm to identify the best matches among a database of diseases that have been annotated with a set of clinical features such as those in the Human Phenotype Ontology (Robinson et al., 2008).

SUMMARY

The several aspects of the present invention provide methods for identifying semantically relevant documents in a database and ordering them by a rank of semantic relevance. A P-value for query results is provided which serves as an index and ranking according to the semantic relevance. Another important aspect of the invention is the application of algorithms for rapidly computing the exact distribution of similarity scores in ontologies, which makes it practicable to index large corpora of information and to keep the index up to date by regularly recalculating the score distribution in a time- and cost-efficient way.

Previously, ontologies have been used in searches to extend keyword searches by including semantically related words drawn from terms in the ontology that are descendents of the term corresponding to the keyword (This is termed the "domain ontology" approach). However, this kind of search does not allow a statistical significance to be assigned to query results. The present invention makes use of the "attribute ontology" approach. The ontology is used to describe attributes of entities (items) of a domain that can be shared by multiple items. Then the terms of the entities of the domain are annotated using terms of the ontology. For instance, speaking of the medical domain, the attributes could be signs or symptoms of disease, and the entities of the domains would be diseases (diagnoses). Then, each entity in the domain can be annotated with a different sets of ontology terms. The initial annotation of entities in a domain will usually be performed by experts, although computational techniques such as text-mining can be used to create or extend annotations. Although an example from medicine and from an imaginary online wine catalog is disclosed, the entities can be from any field of knowledge or commerce, such as categories of books, categories of auction items, fields of knowledge such as science and engineering, or areas of business that are relevant to a company.

One or more ontologies can be used to index a set of entities in this way. A query can be performed using terms from the ontologies. For each match of one or more terms, a similarity score is calculated as defined in equation (2) or a related scheme. The query is performed to identify entities that have been annotating using terms from one or more of the ontologies that are similar to the query. A P-value (either calculated dynamically or taken from a precalculated table) is assigned to each similarity score for each entity annotated by the ontology or ontologies being used. The P-values are used to rank the search results according to relevance. If multiple ontologies have been used (for instance, one ontology for each of the categories presented for online auctions), then the significance level associated with the P-value can be taken as a measure of which of the categories (one or more) is most appropriate for placing an item to be auctioned.

Another aspect of the present invention is a rapid method for calculating similarity score distributions in ontologies. This method represents an acceleration of many thousand fold and makes the use of ontological similarity searches using statistical significance practicable for the first time.

BRIEF DESCRIPTION OF THE DRAWINGS

FIG. 7 is a depiction of an algorithm for computing an attribute of an ontology.

FIG. 8 is a depiction of an algorithm for computing the score distribution for an ontology.

DETAILED DESCRIPTION

Figure 1:
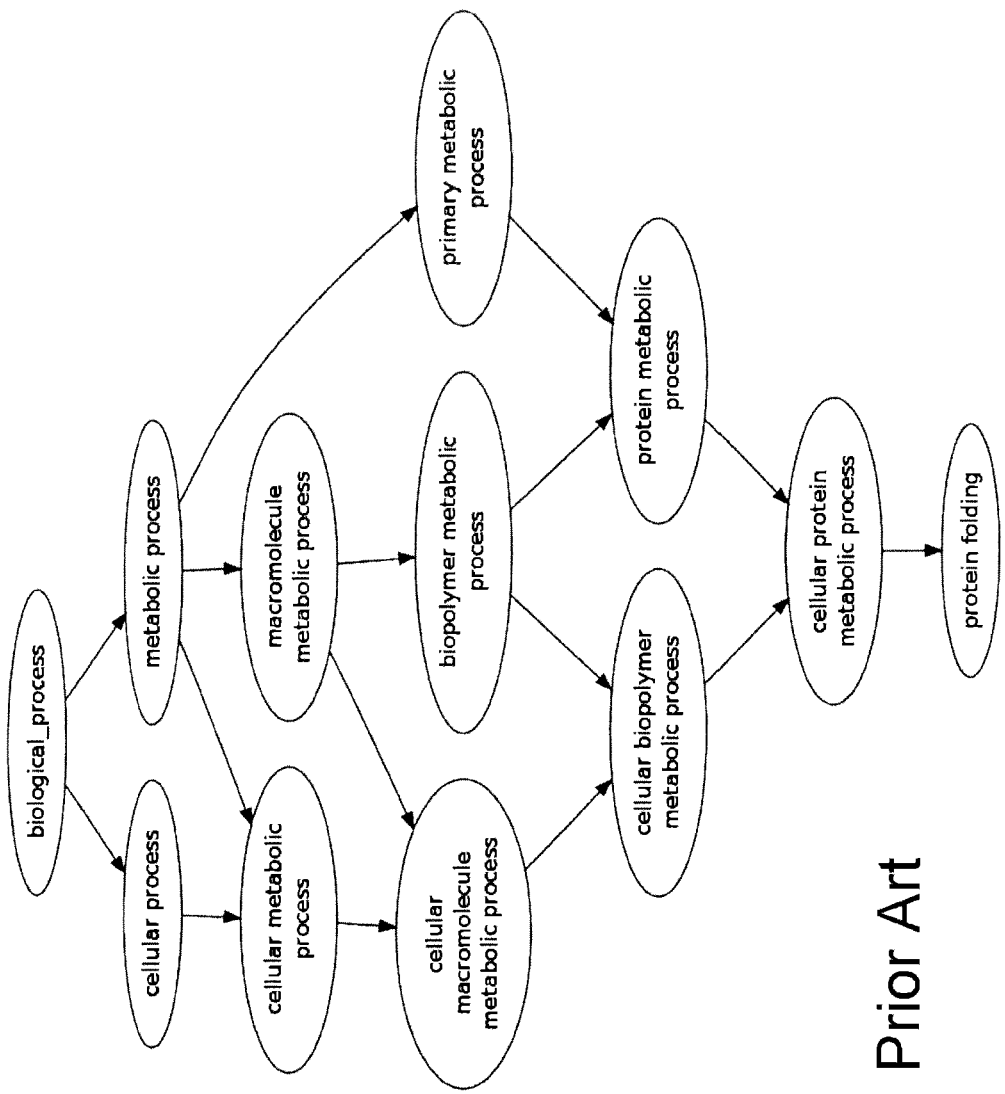
FIG. 1 shows an excerpt of an ontology displayed in the form of a directed acyclic graph (DAG).
Figure 2:
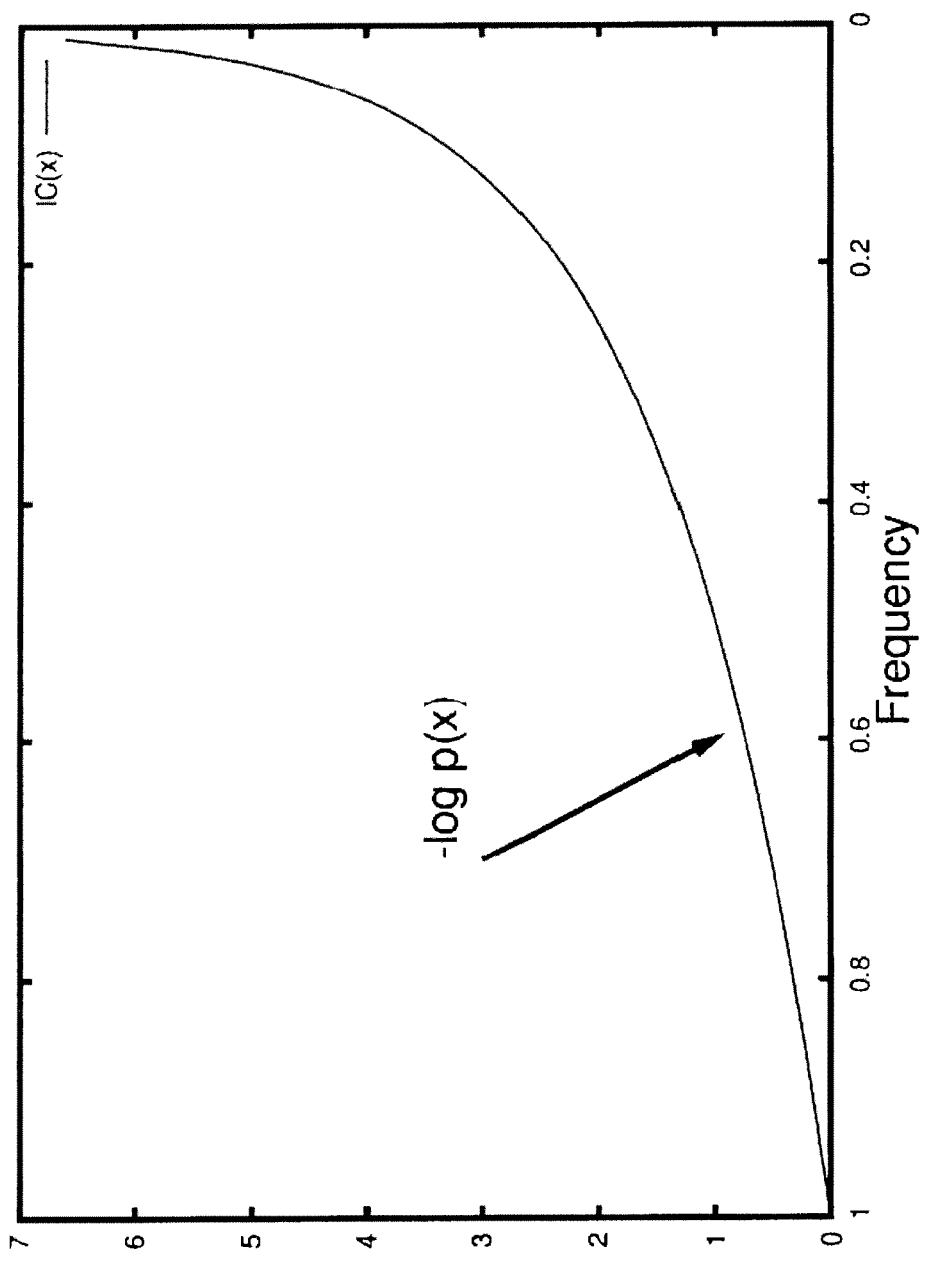
FIG. 2 illustrates the relationship between information content and annotation frequency of ontology terms.
Figure 3:
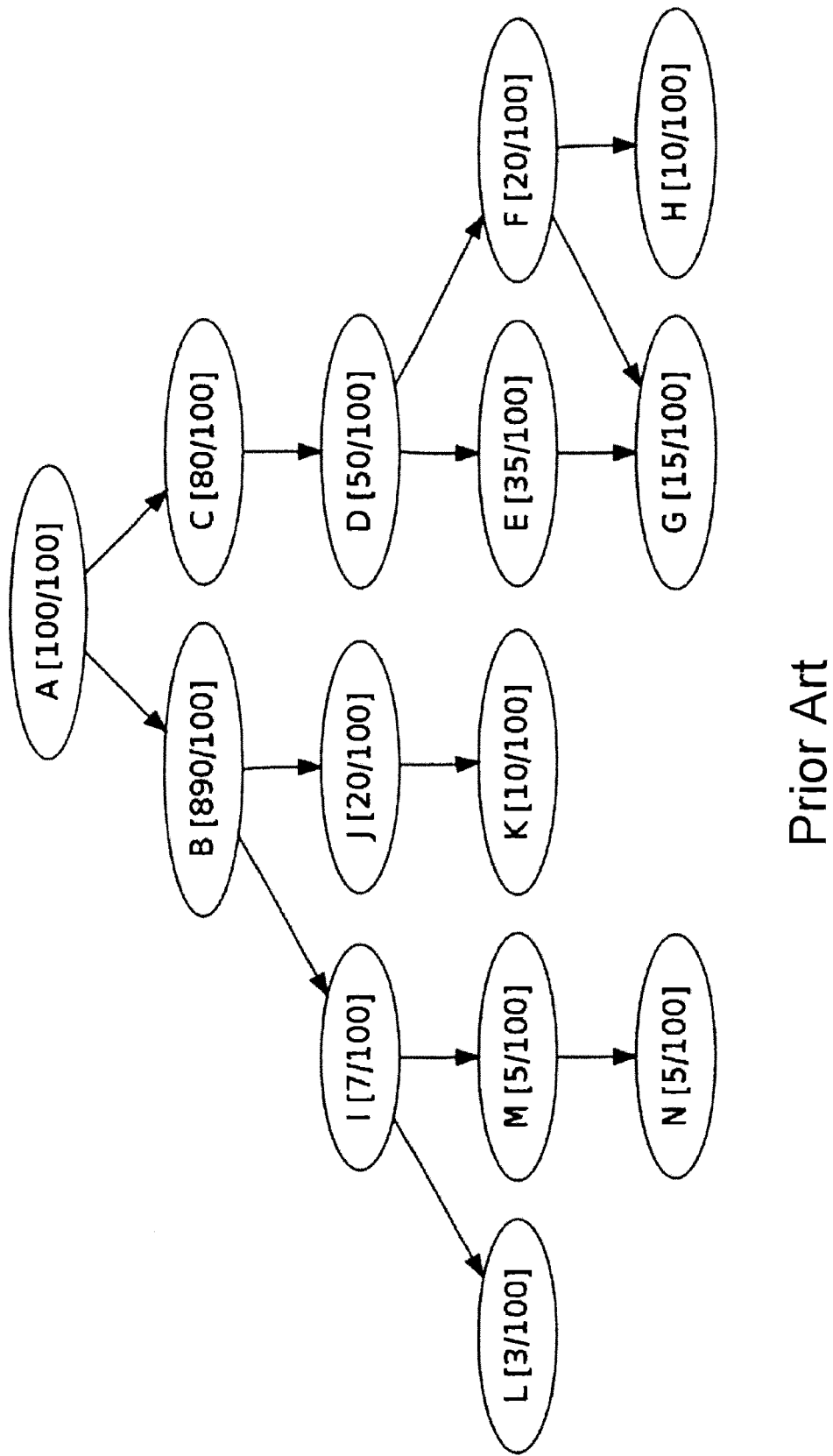
FIG. 3 shows a measure of semantic similarity between terms.
Figure 4:
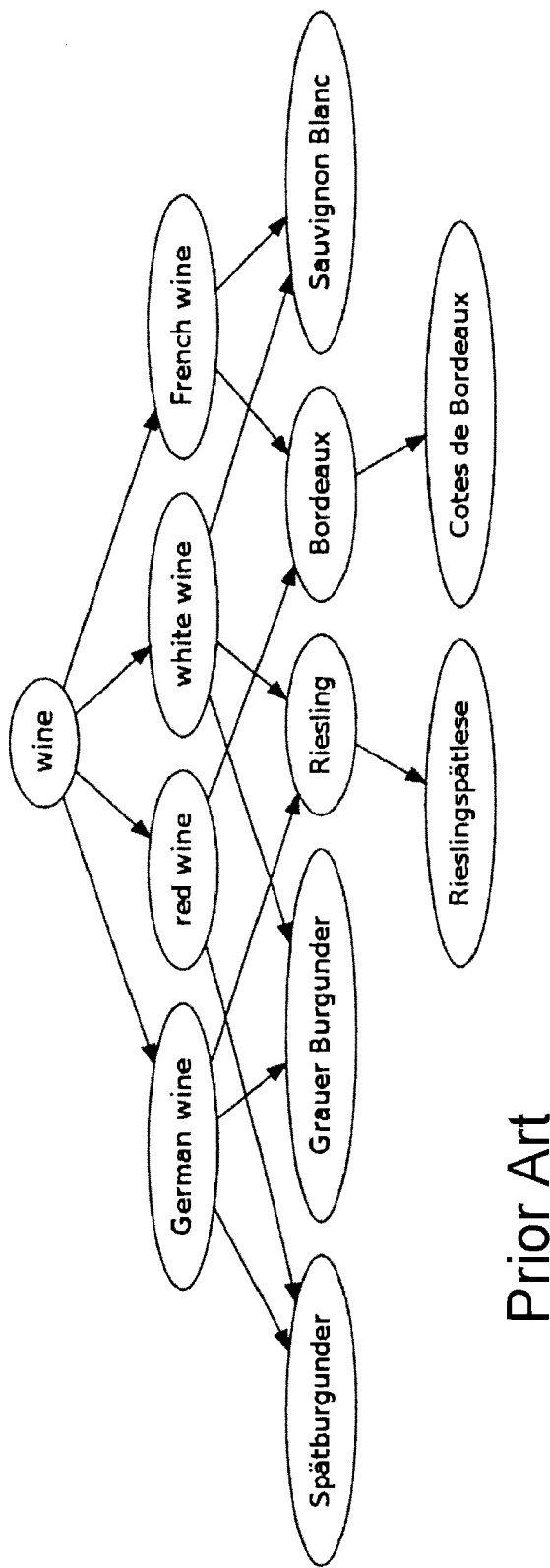
FIG. 4 shows an example of a domain ontology for classifying European wines.
Figure 5:
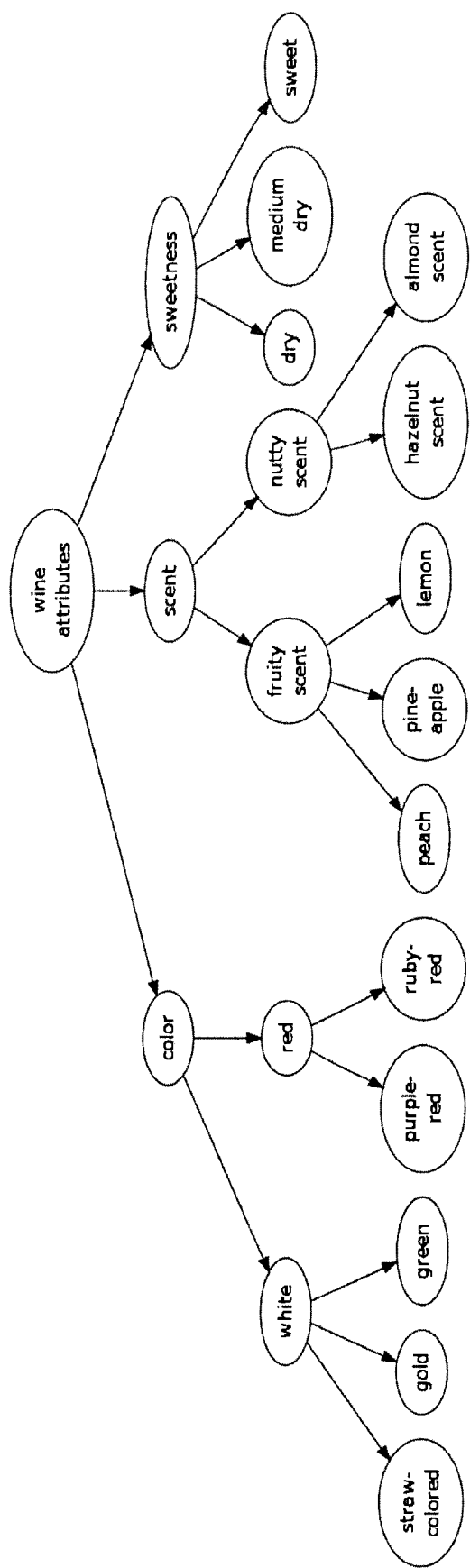
FIG. 5 shows an example of an ontology used to show the attributes on an item in a domain.

The methods described herein utilize similarity measures in ontologies. One aspect of the methods is to use an ontology that describes the attributes of objects in a domain together with annotations of many domain objects to the terms of the ontology. For instance, if the domain is wine, a domain object could be a Riesling white wine. Attributes could be used to describe the color, taste, and other characteristics of the wine. Each object in the domain would be annotated to various combinations of the terms of the attribute ontology.

The similarity between two terms in an ontology can be calculated as the information content ("IC") of their most informative common ancestor (MICA) (Resnik, P., 1995. Using information content to evaluate semantic similarity in a taxonomy. In Proceedings of the 14th International Joint Conference on Artificial Intelligence) which is taken to be the negative logarithm of its probability, $$IC(n) = -\log p(n), \qquad (3)$$

where p(n) denotes the frequency of annotations of n among all items in the domain. For instance, the probability can be estimated by the frequency with which the term is used to annotate objects of a domain (if 7 objects from a domain containing 100 objects are annotated with some term a, then p(a)=0.07 and IC(a)=−log 0.07). Other probability measures can also be used.

Denoting the set of all common ancestor terms of terms $t_1$ and $t_2$ as $A(t_1,t_2)$, one may define the similarity between two terms $t_1$ and $t_2$ as $$sim(t_1, t_2) = \max_{a \in A(t_1,t_2)} -\log p(a). \qquad (4)$$

This measure is adapted to calculate the similarity between a set of query terms and all items in a domain. The query terms are used to describe the attributes of an object being sought after. For instance, if a customer is looking to find a dry fruity German white wine from an online catalog, he or she might search with the attribute ontology terms 'white', 'fruity', and 'German'. A computer program or other tool would calculate the similarity between these query terms and the ontology terms used to annotate the objects of the domain (in this case, wines). There might be a high similarity between these query terms and say a Riesling wine which is annotated to 'white', 'lemony taste' and 'German', but a low similarity to a Lambrusco wine, which is annotated to 'red', 'sweet', and 'Italian'.

In order to calculate the similarity as described above, i.e. a set of query terms A and a set of terms B used to annotated an object in a domain, one needs to combine the pairwise similarities between pairs of ontology terms. A way of doing this is to take the average similarity of all possible pairwise combinations between the sets A and B (see equation 7), but many other ways are possible, such as taking the maximum pair similarity between any pair (see equation 8).

The result of such a similarity search will be a score S that quantifies the similarity between the query set A and the domain object B. This score can be used to rank the relevance of the objects in a domain. For instance, if a customer is searching a catalog for wines, as described above, using an online catalog, a ranked list of links to the most relevant wines could be returned to the user according to the similarity score of each domain object (wine) with the query terms. A similar scheme could be used to rank the relevance of any kind of items in catalogs, archives, libraries, collections of documents, databases, and similar things.

The aspect of the disclosed invention described in the previous section applies to attribute ontologies. The following aspects can be applied to any kind of ontology, including attribute and domain ontologies as described in the Background section of this document.

Dependent on the similarity measures used, the raw score is not expressive of the significance of the search. That is, a given raw score may represent a good match for one particular domain object, and a poor match for another. This represents a drawback of searching using the raw semantic similarity scores that are addressed with the following aspects of the disclosed invention. The P-value of a similarity search is defined as the probability to get a certain score S or better under a random model. Such a random model could be to consider drawing independently from all terms of the ontology or to draw terms with a specific hierarchical concept in mind. For a given score S the P-value can be easily computed from the complete score distribution, where one generates all possible queries, tabulates their scores, and calculates the number of queries Q that have a score≥S.

For instance, if the ontology has V terms, and the query Q is made up of q ontology terms, then one can define the P-value of obtaining a certain score or better with a random query to some domain object A as follows:

$$P(S \geq s) = \frac{\text{Number of queries such that } sim(Q, A) \geq s}{\text{Total number of possible queries}} \quad (5)$$

The total number of possible queries depends on the way valid queries are defined. In one simple case (where any combination of q query terms without replacement is allowed), if the ontology has V terms, the total number of possible queries is:

$$\binom{V}{q} \quad (6)$$

However, it is also possible to disallow certain combinations of terms. For instance, one could disallow queries containing a parent and child term. In this case, the numerator and denominator of equation (5) are changed accordingly. It is also possible to weight the probability with which a particular set of query terms is drawn. This could be reflected by using weighted sums in equation (5). Depending on the application, a multiple-testing correction may be applied to the raw P-values returned by the algorithm.

The P-value is specified above in reference to an object A, but one might also define the P-value according to all objects that have been annotated with an ontology.

Another way of obtaining P-values is to simulate many random queries and tabulate the resulting distribution of scores. For instance, to use a computer program to generate many thousands of random queries and record the scores. Yet another approach could be to use statistical methods to approximate the shape or tail of the score distribution and from that derive a P-value.

This aspect of the disclosed invention can be used with any kind of ontology. The goal of the method is to exploit the structure of the ontology (that is, the data structure that is used to represent the ontology), in order to calculate the complete or partial score distribution without having to calculate a score for each possible set of query terms explicitly. Once the distribution of scores is known, it can then be used to calculate P-values for queries using equation (5).

There are several ways of exploiting the structure of the ontology in order to do this using computer algorithms. In the following, an algorithm is presented in detail, but this algorithm should be taken to be representative of a class of algorithms that can be used for this purpose.

An ontology O is considered composed of a set of terms that are linked via an is—a or part—of or other relationships. The ontology O can then be represented by a directed acyclic graph (DAG) D=(V,E), where every term is a node in V and every link is a directed edge in E. A directed edge going from node $n_1$ to $n_2$ is denoted $e_{1,2}$. An item i is defined as an abstract entity to which terms of the ontology are annotated.

Let Anc(n) be defined as the ancestors of n, i.e., the nodes that are found on all paths from node n to the root of D, including n. It is noted that the true-path rule states that if an item is explicitly annotated to a term n, it is implicitly annotated to Anc(n). In order to describe the implicit annotations $annot_S$ is defined. Let S be the set of terms that has been explicitly annotated to item i, then $annot_S=\{Anc(n) | n \in S\}$, namely all terms that are annotated to item i and all their ancestors in D. Let the set of common ancestors of two nodes $n_1$ and $n_2$ be defined as $ComAnc(n1,n2)=Anc(n1) \cap Anc(n2)$. Let Desc(n) be the set of descendant nodes of n, again including n. Note that in this notation descendant nodes are considered only once, even if there are multiple paths leading to them. A number of different pairwise term similarity measures can be used. In the following, one of them will be used (as described in equation 3).

The information content is a nondecreasing function on the nodes of D as we descend in the hierarchy and therefore it is monotonic. The similarity between two nodes is defined in equation (4).

In the following two definitions of similarity measures are introduced between two sets of terms $I_1$ and $I_2$:

$$sim^{max}(I_1, I_2) = \max_{n_1 \in I_1, n_2 \in I_2} sim(n_1, n_2) \quad (7)$$

$$sim^{avg}(I_1, I_2) = \frac{1}{|I_1|} \max_{n_1 \in I_1, n_2 \in I_2} sim(n_1, n_2) \quad (8)$$

Note that Eq. (7) is not symmetric, i.e., it must not necessarily be true that $sim^{avg}(I_1,I_2)=sim^{avg}(I_2,I_1)$. See FIG. 6 for an example computation of $sim^{avg}$. Here, the target set TS={B,C} is shown as black nodes and the query set Q={D, F} is shown as nodes surrounded by dashed lines. Under the assumption that IC(C)≥IC(B) we have $$sim^{avg}(Q, TS) = \frac{sim(D, B) + sim(F, C)}{2} = \frac{IC(B) + IC(C)}{2}$$

In what follows there is a need to compute the similarity also between a multiset and a set of terms. The concept of multisets (Blizard, W. D., Multiset theory. Notre Dame Journal of Formal Logic 1989, 30:36-66) is a generalization of the concept of sets. In contrast to sets, in which elements can only have a single membership, the elements of multisets may appear more than once. Therefore, all sets are multisets, while a multiset is not a set if an element appears more than once.

Formally, a multiset M is a set of pairs, $M=\{(u_1,M_1), \ldots, (u_d,M_d)\}$, in which $u_i \in U=\{u_1, \ldots, u_d\}$ are the elements of the underlying set U, with $U \subseteq V$. $M_i$ defines the multiplicity of $u_i$ in the multiset and the sum of the multiplicities of M is called the cardinality of M, denoted |M|. Note that only multiplicities in the domain of positive integers are considered.

Denote the similarity for a multiset M compared to a set of terms $I_1$, with a slight abuse of notation, as (similar equation for $sim^{max}$ not shown)

$$sim^{avg}(M, I_1) = \frac{1}{|M|} \sum_{(u_i, M_i) \in M} M_i \cdot \max_{n_j \in I_1} sim(u_i, n_j). \quad (9)$$

The multiset coefficient M(n,q)=binom(n+q−1,q) denotes the number of distinct multisets of cardinality q, with elements taken from a finite set of cardinality n. (Note that binom(n,m)=n!/m!(n−m)! denotes the binomial coefficient). The multiset coefficient describes how many ways there are to choose q elements from a set of n elements if repetitions are allowed.

The algorithm will be used to calculate a P-value for the null hypothesis that a similarity score of S or greater for a set of q query terms Q and a target set TS has been observed by chance. This P-value is defined as:

$$P_{q,TS}^{sim}(S \geq s) \frac{|\{Q|sim(Q, TS) \geq s, Q = \{n_1, \ldots, n_q\} \subseteq V\}|}{\binom{|V|}{q}}. \quad (10)$$

Note that equation 10 defines one type of P-value and query model that satisfies equation 5, but other definitions that reflect different ways of weighting individual queries or query combinations, apply equally to the disclosed invention.

No an is presented regarding how the complexity of a DAG D to a tree is reduced by exploiting the maximization step in the definition of similarity (see equation 7 and equation 8). Recall that all nodes that are annotated with terms from the target set TS are contained in $annot_{TS}$. It can be shown that only the IC values of nodes in $annot_{TS}$ are relevant for the score distribution computation. Put differently, D can be collapsed into subtrees that summarize all nodes in V which contribute the same score to the score distribution. In order to explain the property of these subtrees the most informative annotated ancestor (MIA) of a node $n_1 \in V$ is defined as:

$$MIA(n1) = \{n_2 | IC(n_2) = \max sim(n_1, n_2)\}. \quad (11)$$

In words, it is considered for each node in V which annotated node in $annot_{TS}$ will be selected in the maximization step over $n_2 \in I_2$ in Eq. (8) and Eq. (7). If several nodes $n_2 \in annot_{TS}$ share the maximum information content with $sim(n_1, n_2)$ in Eq. 11, then one node $n_2$ is arbitrarily selected, i.e., always $|MIA(n_1)|=1$. Also it is defined that $$MIA(a) = a, \forall a \in annot_{TS}.$$

The definition resolves the problems with nodes that have more than one parent and is the basic property exploited in the disclosed algorithm. Now all nodes in V that have the same MIA can be summarized. For all nodes $a \in annot_{TS}$ the set of associated descendants (AD) of a is defined as:

$$AD(a) = \{n | n \in V : MIA(n) = a\} \quad (12)$$

Figure 6:
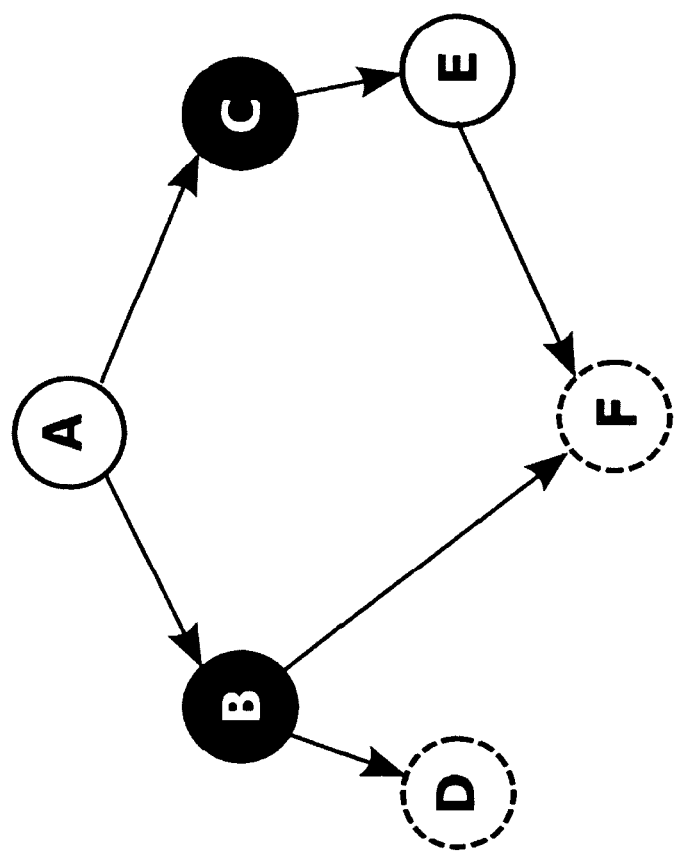
FIG. 6 shows an example computation of a similarity measure for sets of terms.

Example 1 If it is assumed that $IC(C) \geq IC(B)$ for the DAG in FIG. 6, then $AD(A) = \{A\}$, $AD(B) = \{B, D\}$ and $AD(C) = \{C, E, F\}$. Node F belongs to AD(C), because $IC(C) = \max_{n_1 \in \{A,B,C\}} sim(n_1, F)$, see Eq. (11). Note that all nodes in $annot_{TS}$ belong to their own set of ADs.

It will now be shown how to compute the subtrees in which all nodes are connected to their MIA by computing a maximum spanning tree. First, edge weights $w_{i,j}$ to the edges of D are introduced. Let $$w_{i,j} = \begin{cases} IC(n_i), & \text{if } n_i \in annot_{TS} \\ \max\{w_{h,i} | e_{h,i} \in E\}, & \text{otherwise} \end{cases} \quad (13)$$

The edge weights are defined in a recursive manner. First, all weights of edges emerging from nodes in $annot_{TS}$ are set. Then the maximum edge weight of all incoming edges for each node not in $annot_{TS}$ are propagated to all outgoing edges of the node, and as such propagated throughout the graph. Computing the edge weights is efficiently done after the nodes of D have been sorted in topological order, see Alg. 3.1 that is depicted in FIG. 7.

It can now be explained how to compute $AD(n_i)$ for every $n_i \in annot_{TS}$. To do so, the directed edges in E will be converted into undirected edges and introduce symmetric edge weights, i.e., $w_{i,j} = w_{j,i}$. It is denoted as $D' = (V', E')$ the modified graph of D with undirected edges and edge weights.

Let MST be the maximum spanning tree of D'. Let MST' be the graph when all edges $e_{i,j} \in MST$ for which $n_i, n_j \in annot_{TS}$ holds are cut. MST' has exactly $|annot_{TS}|$ connected components. The MST algorithm is applied in order to remove edges for every node $n \in V$ with multiple parent terms in such a way to keep only the edge to the parent term that is connected to MIA(n). It can be shown that $AD(n_i) = C_i$ for each $n_i \in annot_{TS}$, where $C_i$ is the connected component in MST' to which $n_i$ belongs.

The size of the sets $AD(n_i)$ for each $n_i \in annot_{TS}$ are the important quantities that are sought, that is the size of the different connected components of MST'. For each $n_i \in annot_{TS}$ let $C_i$ be the connected component in MST' to which $n_i$ belongs. It is defined that:

$$Children(n_i) = |C_i|. \quad (14)$$

All these steps are summarized in Alg. 3.1 (see FIG. 7).

A naive approach to calculating the complete score distribution is to determine the similarity of each possible term combination $Q \subseteq V$ of size q with the fixed target set TS. The intuition behind the disclosed algorithm is that instead of selecting all combinations of all nodes of V and constructing the score distribution one by one, the combinations of nodes in $annot_{TS}$ with identical scores are focused on, and the score frequencies are calculated by taking advantage of the nodes' Children attribute.

In order to compute the score distribution using only nodes in $annot_{TS}$ for a fixed q, it is needed to consider combinations in which the same collapsed node can appear multiple times, regardless of the order. The total count of nodes with repetition has to be q. The properties of these types of combinations have been formalized in the theory of multisets (see above).

Instead of considering sets of nodes in V the multisets M of nodes in $annot_{TS}$ will now be considered. Clearly, $U \in annot_{TS}$ for any such multiset M with underlying set U. The similarity score computed for M is the same for all of the sets of nodes that correspond to M. Therefore, if the number of such sets as well as the score corresponding to each multiset M of nodes in $annot_{TS}$ can be calculated, the distribution of similarity scores over the original graph can easily be determined. The number of ways of drawing $M_i$ nodes from a component of size $Children(u_i)$ can be calculated using the binomial coefficient. The total number of combinations is then simply the product of all binomial coefficients, denoted as the multiset frequency for a multiset M:

$$freq(M) = \prod_{(u_i, M_i)} \binom{Children(u_i)}{M_i} \quad (15)$$

The score distribution is represented as $SD = \{(s_1, f_1), \ldots, (s_k, f_k)\}$. Every pair $(s_i, f_i) \in SD$ contains a unique score $s_i$ and a count $f_i$ that defines its frequency within the distribution.

The algorithm requires two basic operations that are applied to the set SD. The first operation called getScorePair returns the pair that represents the given score or nil in case the entry does not exist. The second operation denoted putScorePair puts the given pair into the set SD, overwriting any previously added pair with the same score.

The complete procedure is shown in Algorithm 3.2 (see FIG. 8). Distinct multisets are all enumerated instead of iterating over all sets of size q. Thereby the number of operations is reduced by many orders of magnitude. In order to compute the score distribution for other score models (for instance Eq. 7), the similarity measure in line 3 of Alg. 3.2 (see FIG. 8) just needs to be replaced.

The disclosed methods can be used for searching in different fields. The idea of searching with attribute ontologies using similarity scores and searching in any ontology using P-value based methods can be used to search in catalogs, databases, collections of documents or archives, and internet servers, among others. Our algorithm that allows rapid calculation of score distributions allows great savings in computational time that would otherwise be required to calculate the score distribution using other methods.

Our methods can be used to search using a raw score for items annotated by an attribute ontology or using the P-value approach in any ontology. One score or P-value can calculated for each item in a database, catalog, collection or documents, etc. The items can be returned to the user with a ranking based on the score or P-value. It is possible to filter the items by P-value, such that only items that achieve a certain P-value threshold (say, above 0.05) are displayed to the user.

The method described in section 3.4.1 can be used as a part of a method to search using multiple ontologies. For example, one can use different ontologies to annotate object from different domains. The user might want to know which ontology matches their query best, and which annotated objects from the domains represent the best matches. For instance, one might use one ontology to describe the attributes of books in computer science, a second ontology to describe the attributes of books in engineering, and a third to describe the attributes of books on mathematics. The terms of the ontologies could be used to annotate books or categories from a catalog of books on these subjects. These three topics overlap to some extent, and it may not always be obvious to a user whether to search for computer science, engineering, or mathematics books. A user can then enter query terms describing the kind of book they would like to find, and one could use the methods in section 3.4.1 to determine if there is a significant match to any book annotated by each of the three ontologies, and to return both which ontologies have relevant results as well as the best matches from the ontologies.

This approach could be extended to any number of ontologies. A computer program could search the ontologies either one after the other or using other methods such as parallel computing. The results of searched such as this could help users both to identify the domains that are most relevant to a set of query terms (i.e., all ontologies that are associated with annotated objects that achieve some threshold score or P-value), and also to identify the annotated objects with the most significant result.

A heuristic can be used to decide which ontologies to analyze in detail. Such heuristic can be implemented by various computational methods including using a hashtable to check whether words from the query are represented in the terms of an ontology and only then continuing with the ontological search method.

It will be clear to one skilled in the state of the art that the above algorithms and methods may be altered in many ways without departing from the score of the invention. Accordingly, the scope of the invention should be determined by the following claims and their legal equivalents.

In the following text some exemplary tasks which can be performed using the methods of this invention are presented.

Companies with archives of documents can use company-specific ontologies to annotate business-relevant categories. Then, archives of documents could be scanned to identify documents that show the best match, or significant matches, to one or more categories. This would enable documents relevant to individual departments in a company such as Marketing or Logistics to be identified. A P-value cutoff can be chosen such that a computer program would forward the document to a given department only if a given level of statistical significance is achieved.

Web sites offering online auctions or classified services can use different ontologies to describe the attributes of the wares or services they are offering for sale.

Different ontologies can be used to describe different classifications of the wares or services depending on the business model of the web site. An ontological similarity search using the methods presented in this invention can be used to find the best category for the item to be placed on sale. Internet-based business that sell wares or that provide a platform for merchants or individuals to sell their wares that belong to certain categories (e.g., televisions or books) can also use one or more ontologies to annotate the offers with the ontology terms. The shop offers clients that are interested in a purchasing product a way to specify some of the attributes they desire. An ontological similarity search using our methods of claims can be used to find specific products satisfying these attributes which then can be presented to the client by the web server. If a user of an online store has found one item that is of interest (for instance, a book), the description of that item can be used with our methods to identify ontology terms for a query that will identify all categories that have similar items, in addition to the category that the item has originally been classified to, if any.

The ontological search methods are used to determine the categories that show the best matches for the documents. The results of the search can be used to determine how to further process the document. For instance, if a significant match is found for one or several categories, the document could be sent to corresponding experts for further processing. If an online store organizes its wares (books or other items) into categories, the description sent by the manufacturer could be used to determine the categories and web pages under which the item would be presented for sale.

Internet-based companies that offer users a portal to find other users that will likely fit for online dating or a personal romantic relationship can use ontologies as vocabularies to describe the user's personal characteristics such as preferences, appearance, wishes, dreams, and life plans. A database could comprise a collection of other users who have entered their personal data.

A job agency or an operator of a job exchange can categorize individuals that are seeking work according to attributes relevant to the job market. They also can apply a similar scheme for the demands of specific vacant jobs of participating companies. Then the methods of our invention can be used to find the best candidates for vacant job position.

Travel agencies or tour operators can describe the properties of their products using terms to describe the attributes of specific vacation offers such as location, type of hotel, and so on. The methods of our invention can be used to provide customers quick access to travel offers and especially to find vacations which fulfill the demands of the customer.

Ontologies can be used to formulate queries in the semantic web. Resource Description Framework (RDF) and other interfaces of the semantic web are employed to identify semantic meanings of websites, which are used to annotate the websites with ontologies. These ontologies, and annotations, are used to search for content using the methods of our invention.

What is claimed is:

1. A method of scoring items resulting from a query containing specified terms, wherein the items being scored are annotated to a set of terms in one or more ontologies comprising the steps of:

determining whether the set of terms in the one or more ontologies to which the items being scored are annotated are semantically related to the terms in the specified query, assigning an observed semantic similarity score to each of the items being scored;

for each item being scored, determining the probability of obtaining the observed semantic similarity score in the event a random set of query terms is used instead of the specified query terms, assigning an individual P-value to the item being scored based on the determined probability, and scoring each of the items, using a computer, according to the assigned P-values.

2. A method of scoring items resulting from a query containing specified terms, wherein the items being scored are annotated to a set of terms in an ontology comprising the steps of:

determining whether the set of terms in the ontology to which the items being scored are annotated are semantically related to the terms in the specified query, assigning a semantic similarity score to each of the items being scored, characterizing a distribution of semantic similarity scores for comparable queries or for queries containing the same number of query terms by identifying ontology terms, which contribute equally to the scores assigned to the items being scored, collapsing portions of the ontology that contain the identified terms, calculating contribution of the collapsed portions to the score distribution of semantic similarity scores, and using the calculated contribution of said collapsed portions to determine, using a computer, the statistical significance of the similarity scores assigned to the items resulting from the query containing said specified query terms.

3. The method according to claim 1, wherein the items being scored are ranked according to the individual P-values assigned to each of the items, and wherein items that are the most relevant to the specified query are assigned P-values that are the lowest.

4. The method of claim 2, wherein the score distribution of similarity scores is weighted by a frequency that a term is annotated to an item.

5. The method of claim 1, wherein collections of documents or books are processed to determine a set of ontology terms that best annotate the collections by text-mining back cover texts, tables of contents, or entire texts.

6. The method of claim 1, wherein, for organizations that have a plurality of experts that are responsible for certain categories, a most relevant ontology term or terms are assigned to each expert, wherein, for each new request for help, the method of claim 1 is used to find an expert from the plurality of experts most suitable for processing the new request or answering a question, and wherein a signal identifying the expert from the plurality of experts most suitable for processing the new request or answering a question is generated.

7. The method of claim 1, wherein, in order to offer wares for sale in certain categories, the one or more ontologies are used to annotate the wares with ontology terms.

8. The method of claim 1 wherein said one or more ontologies are used as vocabularies to describe symptoms or diseases of patients, and wherein a search for candidate diagnoses is carried out in a database based on said one or more ontologies.

9. The method of claim 1 wherein said one or more ontologies are used as vocabularies to describe drugs and chemical compounds, and wherein a search for candidate drugs and chemical compounds is carried out in a database based on said one or more ontologies.

10. The method of claim 1 wherein said one or more ontologies are used as vocabularies to describe a user's personal characteristics, and wherein a search for other users having matching personal characteristics is carried out in a database based on said one or more ontologies.

11. The method of claim 1, wherein said one or more ontologies are used to describe attributes of a plurality of departments, a plurality of attributes of a plurality of individual workers, or a combination of the plurality of departments and the plurality of attributes, and wherein a search for a department from the plurality of departments or an individual worker from the plurality of individual workers is carried out in a database based on said one or more ontologies.

12. The method of claim 1, wherein said one or more ontologies are used to describe attributes of jobs and individuals, and wherein a search for matches between jobs and individuals is carried out in a database based on said one or more ontologies.

13. The method of claim 1, wherein said one or more ontologies are used as vocabularies to describe properties of services.

14. The method of claim 1, wherein said one or more ontologies are used to process websites in a world-wide web, documents that are made accessible via the world-wide web, or a combination thereof.

15. The method of claim 1, wherein the P-values are compared to an adjustable P-value cutoff, and wherein items from the plurality of items are returned whose P-values pass the adjustable P-value cutoff.

16. The method of claim 1, wherein a heuristic is used to decide which ontologies to analyze.

17. The method of claim 1, wherein parallel processing computational techniques are used to analyze several ontologies in parallel in order to process a query with the method of claim 1.

18. The method of claim 1, wherein said one or more ontologies are used to formulate queries in a semantic web.

19. The method of claim 1, wherein multiple ontologies are used to annotate the plurality of items from an online or offline classified advertising service that offers users multiple classifications or categories in which to offer items for sale.

20. The method of claim 10 wherein the user's personal characteristics comprise at least one of preferences, appearance, wishes, dreams, and life plans.

21. The method of claim 1, wherein said one or more ontologies are used as vocabularies to describe properties of travel products.

* * * * *